350-321

Dec. 13, 1966 W. R. BAINS ETAL 3,290,985

HEAD MOTION SENSING SYSTEM

Filed May 21, 1963 3 Sheets-Sheet 1

INVENTORS
WILLIAM R. BAINS
FELIX W.A. KNOLL
IRVING J. SPIRO

BY Laurence S. Epstein
ATTORNEYS

INVENTORS
WILLIAM R. BAINS
FELIX W.A. KNOLL
IRVING J. SPIRO
BY
Laurence S. Epstein
ATTORNEYS INVENTORS
WILLIAM R. BAINS
FELIX W.A. KNOLL
IRVING J. SPIRO
BY
Laurence S. Epstein
ATTORNEYS United States Patent Office 3,290,985
Patented Dec. 13, 1966

3,290,985
HEAD MOTION SENSING SYSTEM

William R. Bains, 12881 Woodlawn Ave., Tustin, Calif.; Felix W. A. Knoll, 6649 Michael John Drive, La Jolla, Calif.; and Irving J. Spiro, 4924 Mammoth Ave., Sherman Oaks, Calif.

Filed May 21, 1963, Ser. No. 282,178
4 Claims. (Cl. 88—1)

This application is a continuation-in-part of application, Serial No. 127,757, filed April 18, 1961, now abandoned, in the name of William R. Bains et al., for "Head Motion Sensing System."

The present invention relates to an improved head motion information sensing system. The head motion sensing system maintains the eye piece of an optical system at a fixed distance from the eye as the head is moved at random. Co-pending application, Serial No. 155,520, filed October 20, 1961, now Patent No. 3,161,846, shows the head motion servo utilized in the instant invention.

Apparatus heretofore utilized for studying the performance of eye movements and for moving an optical instrument in accordance with the motion of the head has been bulky, expensive and complicated in operation.

One of the objects of the instant invention is to provide an improved sensing system for imparting head movement information to a servo system.

Another object of the instant invention is to provide an improved apparatus for coupling an optical system to the head.

A further object of the instant invention is to provide an improved head motion sensing system which is light in weight and inexpensive to construct.

Other objects and many of the attendant advantages of this invention will be readily appreciated as the same becomes better understood by reference to the following detailed description when considered in connection with the accompanying drawings wherein.

Figure 1:
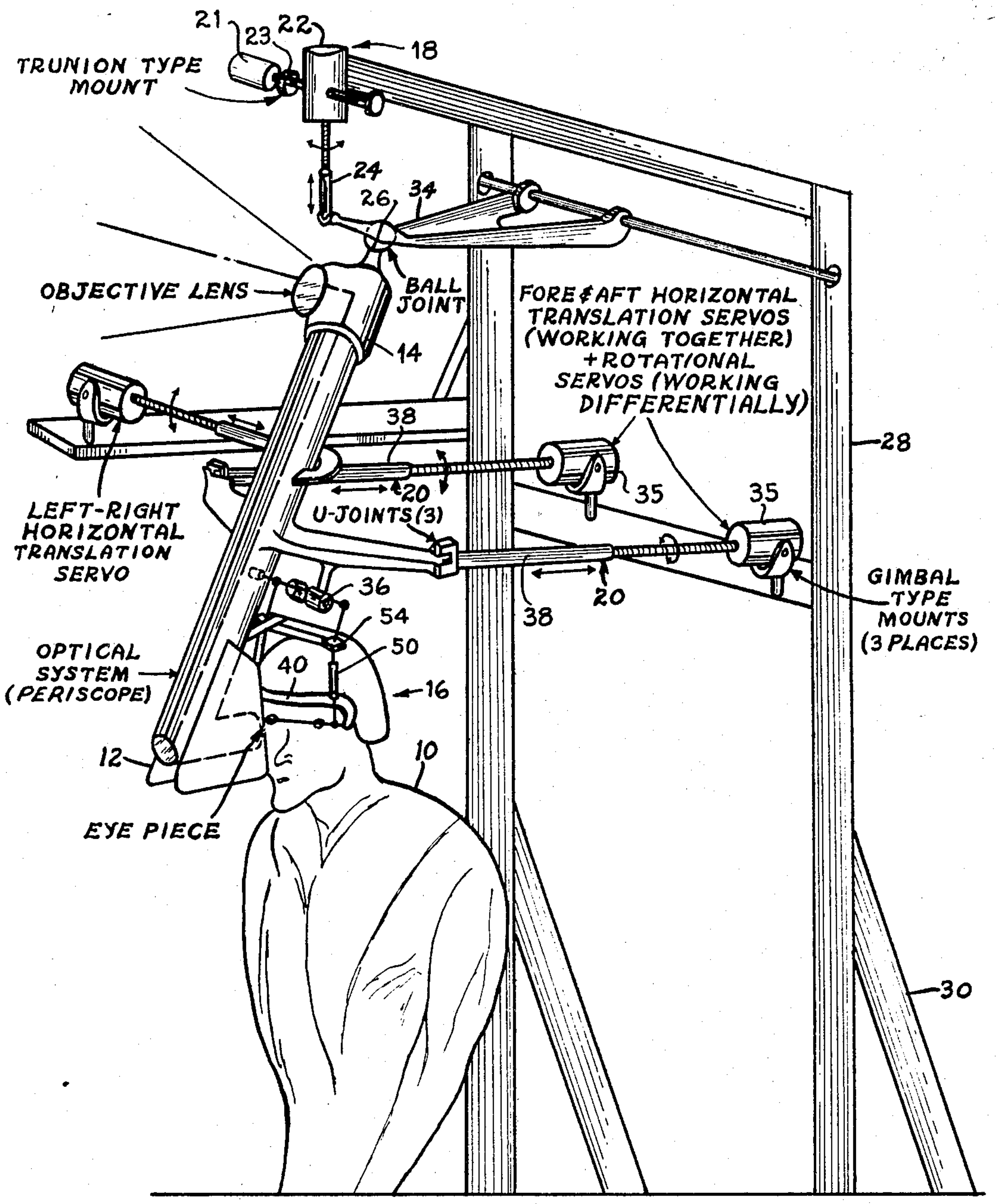
FIG. 1 is a perspective of the head motion sensing system of the invention.

Referring to the drawings, FIG. 1 shows the subject 10 seated in front of the head motion sensing system comprising the viewer 12 and the head motion sensing apparatus 14. The head motion sensing apparatus comprises head motion sensing parts 16 which are mechanically coupled to the head of the subject and a servo system 18 and 20 which imparts horizontal, vertical and rotational motion to the viewed object 12 whereby head motions of the subject 10 are sensed by the sensing system 16 and the servo system operates to move the viewed subject 12 to follow the subject's head motion. Operation of the vertical moving apparatus 18 is as follows:

The optical system which is utilized with the instant invention is a standard periscope type of system. The object viewed by the viewer 12 is that which lies in the field of view of the optical periscope shown as viewing angle in FIG. 1. If a moving object appears within this field of view, the motion of the viewed object is the inherent cause of the subject desiring to move his head in order to follow the movement. As he turns his head, he causes the periscope to turn in like amount so as to keep the moving object within his field of view.

Figure 2:
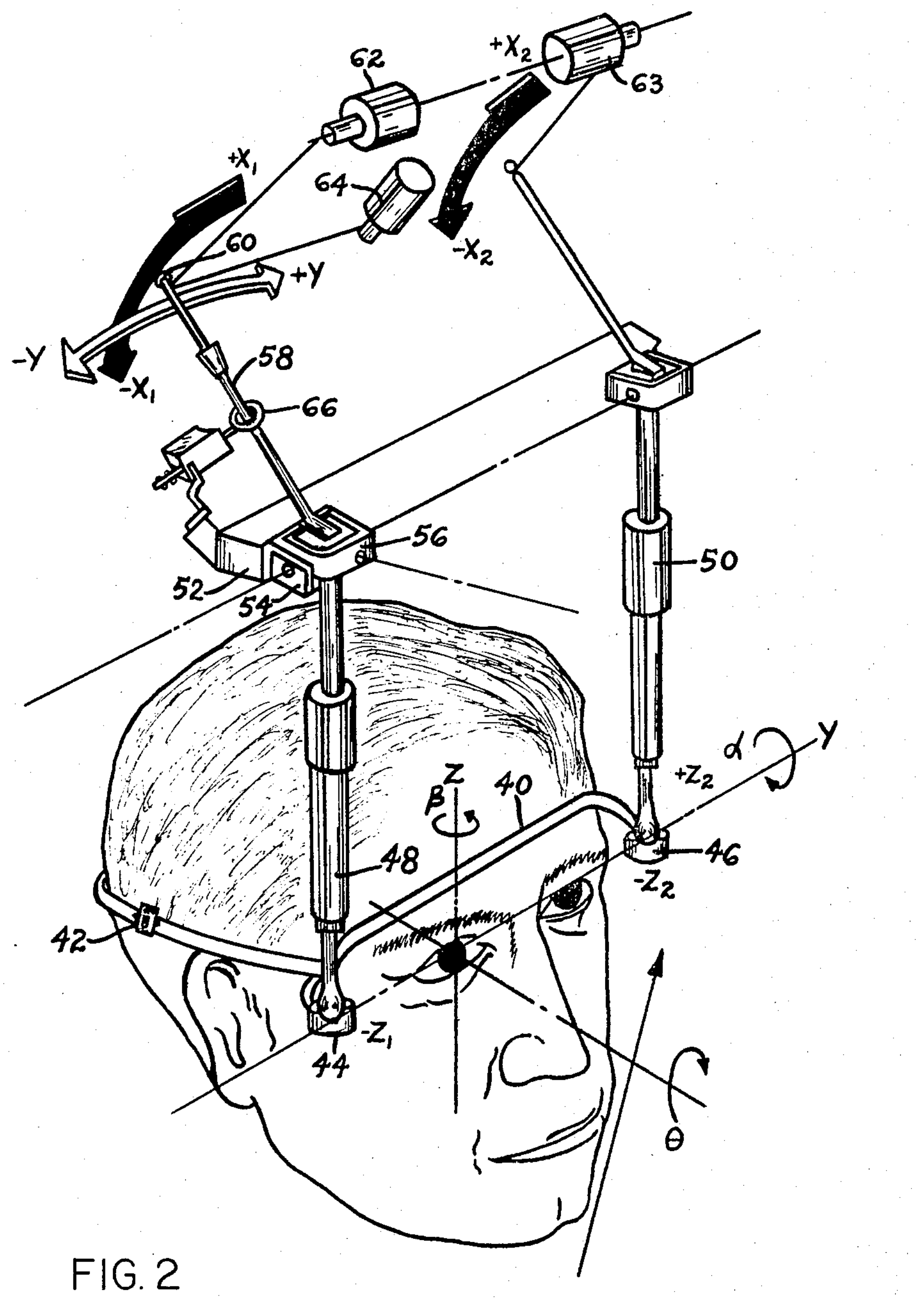
FIG. 2 shows a detailed view of the mechanical gimbal axes of the head motion sensing system.

Unlike a submarine commander, who must use his hands to turn his periscope, the subject trainee in the instant invention accomplished a similar result by merely turning his head effortlessly. As fast as he turns it back and forth, the periscope likewise turns and the viewer of the instrument always stays immediately before his eye. His body muscles do not move the weight of the periscope as the servo system accomplishes it for him. Thus, the system realistically simulates the feeling and view of watching a realistic scene from a tank or similar mobile, closed object. The pivot point for movement activated by fore and aft motors 35 is pivot point 26. When the pivot structure 12 is rotated in a like manner, screw 38 of the servo 20 unscrews. The screws 38 move in and out differentially. If the potentiometers 48 and 50 should malfunction or the servo not have sufficient power to accelerate the eye pieces as fast as the subject accelerates his eyes, the shorting ring 66, FIG. 2, is contacted by a rod 58. The shorting ring acts as a switch to block all head motion signals to the servos and substitutes instead a prepared signal from a safety circuit to cause the servos to drive the eye piece forward away from the subject's eyes to the fullest extent of their travel with maximum speed. The extreme travel involved in the safety maneuver might cause the vertical linear potentiometers 48 and 50 to stretch beyond their mechanical capability and for this reason, these ball ends are connected to the subject's head through permanently magnetic servo cups 44 and 46. These magnets are strong enough to maintain the linear motion of the ball ends in place under all normal accelerations, but are not strong enough to prevent the ball ends from breaking away under the influence of the previously described safety maneuver. In the event of a breakaway, no damage to the associated parts is sustained and after activating a reset circuit the sensor system can be recoupled to the head pieces 42, 44 and 46 and normal use resumed.

Upon the receipt of a signal to move the object viewed by the demonstrator viewer 12 in a vertical direction, motor 21 rotates. Motor 21 can be a reversable motor or a unidirectional motor with a reversing clutch 23. The preferred embodiment utilizes this reversing clutch 23. The direction of clutch operation is controlled by a signal received by this clutch from the vertical sensing servo 22 which is part of the head motion sensing apparatus 16. Rotation of motor 21 and engagement of clutch 23 causes expanding screw 24 to rotate and expand. If the direction of clutch 23 calls for a downward movement, the screw 24 expands towards the operator causing the entire overhanging structure to move downward since it is pivoted at point 26 to stationary supports 28 and 30. The reversal of clutch 23 causes expanding screw 24 to contract causing the overhanging structure to move up and away from the operator. If the head motion sensing apparatus 16 requires a rotational movement of the viewer 12, the fore and aft servo motors 35 rotate the viewer in the desired direction. If a horizontal movement of the object viewed by demonstration viewer 12 is required, then motor 36 rotates in the desired direction thereby rotating expanding screw 38 and causing the overhanging structure to move in the desired horizontal direction. Thus, movement of the viewer 12 is obtained in three directions about the head of the subject 10. The head sensing movements which determine the movements of the operational motors are shown in detail in FIG. 2. Bar 40 is fastened to the brow of the subject by strap means 42. Bar means 40 has two button magnets extending from its ends 44 and 46. Each of these magnets has attracted thereto the end of *linear* potentiometers, 48 and 50 respectively. Each of these linear potentiometers has a ball end which fits into a socket depression within the magnets 44 and 46 thereby permitting rotational movements of the button magnets about the ball end of the potentiometer while the potentiometers are in contact with the magnets 44 and 46. The other ends of each of the linear potentiometers 48 and 50 have motion sensing arms attached thereto which actuate potentiometers to control the movement of the servo positioning motors for following the head movements of the subject. The operation of the connecting arms of both linear potentiometers 48 and 50 are the same and therefore only the operation of linear potentiometer 48 and its associated motion sensing arm will be described.

There is a separate cord joining the end of arm 58 to the pulley of potentiometer 62 and the end of arm 58 to the pulley on potentiometer 64. A movement of rod end 58 in the $-y$ plane does cause an error in the $x$ plane. The magnitude of this erroneous signal varies as the tangent of the angle involved. The important point is, however, that though this erroneous signal is theoretically detrimental, it is tolerable when the optical system it controls presents to the eye a very large instrument pupil as in the instant invention. The instrument pupil is designed to be large in order to permit the subject to roll his eyes while minutely scanning the field without losing the image. This excessive instrument pupil size effectively accommodates the small positioning error described.

The rotary potentiometer cord pulleys are provided with rewind springs which apply a constant torque on the pulleys to take in slack cord. The rotory inertia of the potentiometers and pulleys is quite small in magnitude and consequently the rewind springs do not have to be very string to keep up with the accelerations involved. In fact, they are so soft in resistance offered to the movement of the subject's head as to be unnoticeable. The function of rotary potentiometer 63 is to provide a signal input which is combined with the signal input of rotary potentiometer 62. If, for instance, a $+x_1$ signal and a $+x_2$ signal are generated and are equal in magnitude this indicates that the subject has begun to translate his head backward but has not turned his head. This signal will cause the fore and aft servos to work together in the same direction to cause the telescope to move backward per command. The same is true in opposite sign for movements in the forward direction. If, however, the subject turns his head, one potentiometer will provide a $+x$ signal, the other a $-x$ signal and the two fore and aft servos will work in opposite directions to cause the telescope to turn about its upper ball joint. Since the left-right servo connects to the telescope at a point in the theoretical line joining the center of the upper ball joint and the center of the human viewing eye, its presence does not cause any intolerable errors in motion.

The linear potentiometer is fixedly attached to the overhanging servo system at bracket 52. Potentiometer 48 can pivot about point 54 for limited movement in one direction and pivot about point 56 for limited movement in a perpendicular direction. Arm 58 is fixedly attached to linear potentiometer 48. This potentiometer has ball end 60 about which is wound a connecting cord which is attached to the rotor of potentiometer 62 and to the rotor of potentiometer 64. Movement of arm 58 about pivot points 54 and 56 moves the rotors of potentiometers 62 and 64 thereby producing a signal which is utilized to move the motors to maintain the position of the viewer 12 in front of subject 10's eyes. Shorting ring 66 which is rigidly attached to bracket 52 shorts out the servo circuits if the subject moves too rapidly for the servo circuits to follow. Thus, with the utilization of very simple motor mechanical linkages and potentiometers the head motions of the subject are sensed by the servo system and followed.

Figure 3:
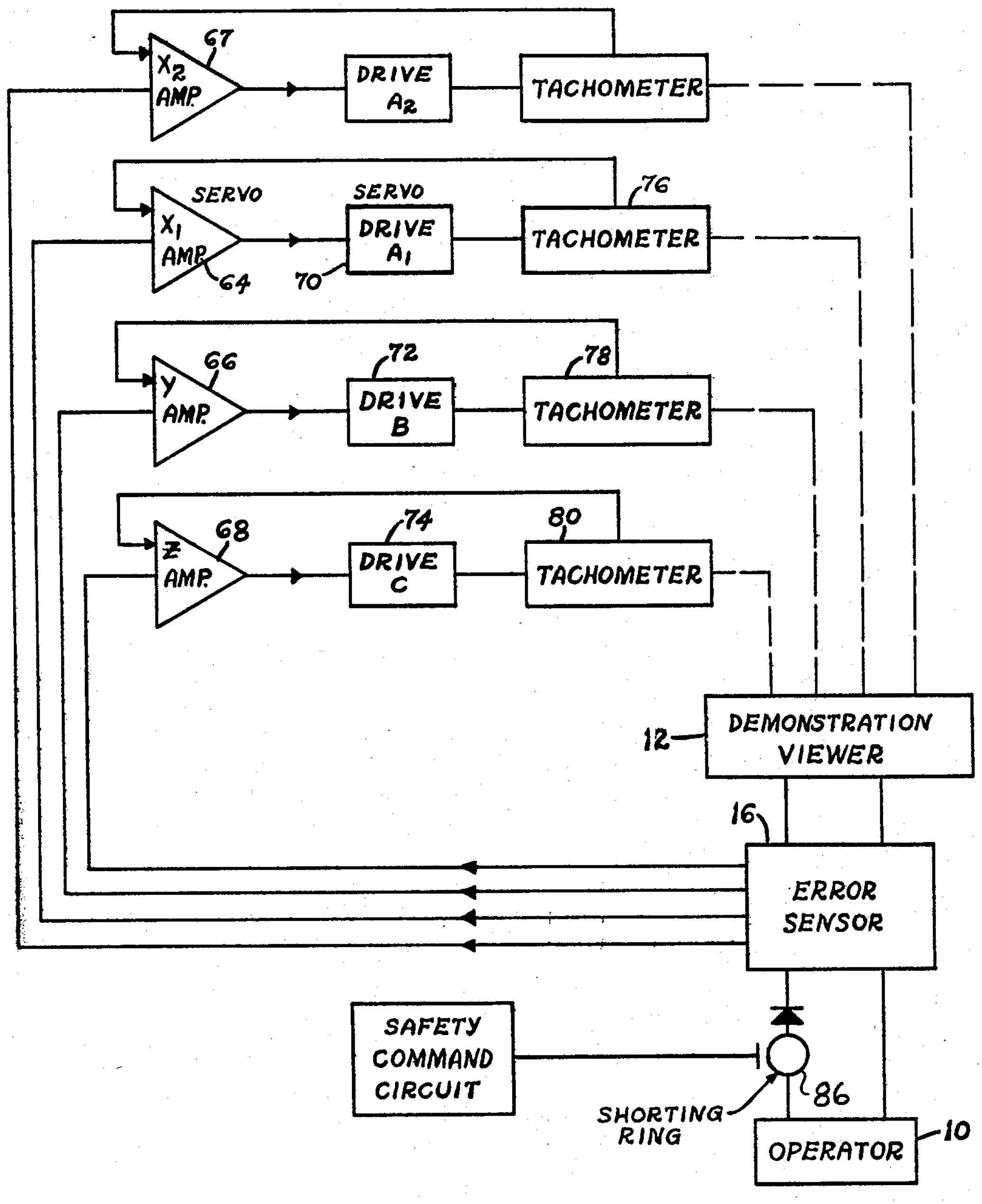
FIG. 3 is a block diagram view of the head motion sensing system.

The block schematic diagrammatic view of FIG. 3 shows the amplifier and the signal paths for the head motion system. The operator 10 has the error sensing apparatus 16 mounted on his brow as shown in FIG. 1. The viewer 12 is maintained in position in front of the operator. Errors sensed by the sensing apparatus 16 are fed to the X, Y and Z servo amplifiers respectively 64, 66 and 68. The amplified error signal is respectively applied to the servo drives 70, 72 and 74. Part of the output from each servo drive is fed back to the respective amplifier from a tachometer respectively 76, 78 and 80 operatively connected to each servo drive. The servo drives maintain the position of the viewer 12 in front of the eyes of the operator 10.

Obviously many modifications and variations of the present invention are possible in the light of the above teachings. It is therefore to be understood that within the scope of the appended claims the invention may be practiced otherwise than as specifically described.

What is claimed is:

1. A device for realistic simulation of terrain images comprising: a light-weight brow device adapted to being mounted on a human head for movement therewith, an optical viewer pivotally mounted upon a support for movement to position said viewer in front of the eyes of a human wearing the brow device, a motion sensing device mounted upon said support and releasably engaging said brow device for sensing movements of the brow device and generating signals indicative of the direction and magnitude of the movement, a first servo motor mounted upon said support and connected to said viewer and to said motion sensing device for moving said viewer in a vertical plane, a second servo motor mounted upon said support and connected to said viewer and to said motion sensing device for moving said viewer in a horizontal plane, third and fourth servo motors mounted upon said support and connected to said viewer and to said motion sensing device for selectively rotating said viewer and tilting said viewer in the azimuthal plane, whereby signals generated by said motion sensing device in response to movement of the wearer of the brow device will actuate the servo motors to continuously position the viewer before the wearer's eyes.

2. The device of claim 1 wherein said brow device includes a pair of permanent magnets mounted on opposite ends of an elongated member adapted to be mounted transversely on the brow of a human head, said motion sensing device including a pair of magnetically permeable elements positioned for contact with said magnets so that the motion sensing device releasably engages the brow device by virtue of the magnetic force of attraction between said magnets and said magnetically permeable elements.

3. The device of claim 2 wherein said motors are electrical motors electrically connected in a control circuit, said motion sensing device having a plurality of potentiometers electrically connected to servo motors by said control circuit for sensing the magnitude and direction of movement of the brow device in each of three mutually perpendicular planes, whereby movement of the brow device varies the resistance in said potentiometers to actuate the servo motors to continuously position the viewer before the wearer's eyes.

4. The device of claim 3 further comprising:

an annular ring of electrically conductive material mounted upon said viewer for movement therewith, said ring being circumferentially positioned around a movable portion of the motion sensing device and being electrically connected to a safety command circuit, whereby, if the wearer of the brow device moves at a rate greater than the response rate of the servo motors, the safety command circuit will actuate the servo motors to release the magnetic coupling between the brow device and the motion sensing device and cause the viewer to move a safe distance away from the wearer.

References Cited by the Examiner

UNITED STATES PATENTS

| | | | |
|---|---|---|---|
| 3,161,846 | 12/1964 | Wagner et al. | 338—67 |
| 3,205,303 | 9/1965 | Bradley | 88—1 |

JEWELL H. PEDERSEN, *Primary Examiner.*

R. L. WIBERT, *Assistant Examiner.*